(12) United States Patent
Cadigan et al.

(10) Patent No.: US 9,548,773 B1
(45) Date of Patent: Jan. 17, 2017

(54) MITIGATION OF EMI/ESD-CAUSED TRANSMISSION ERRORS ON AN ELECTRONIC CIRCUIT

(71) Applicant: International Business Machines Corporation, Armonk, NY (US)

(72) Inventors: David D. Cadigan, Poughkeepsie, NY (US); Samuel R. Connor, Apex, NC (US); Michael A. Cracraft, Poughkeepsie, NY (US); William V. Huott, Holmes, NY (US); Adam J. McPadden, Underhill, VT (US); Anuwat Saetow, Austin, TX (US); Gary A. Tressler, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/066,194

(22) Filed: Mar. 10, 2016

(51) Int. Cl.
    *H04B 1/04* (2006.01)
    *H04B 17/336* (2015.01)

(52) U.S. Cl.
    CPC .......... *H04B 1/0475* (2013.01); *H04B 17/336* (2015.01)

(58) Field of Classification Search
    CPC ............................. H04B 1/0475; H04B 17/336
    See application file for complete search history.

(56) References Cited

U.S. PATENT DOCUMENTS

| 3,927,375 A | 12/1975 | Lanoe et al. |
| 4,016,590 A | 4/1977 | Baur et al. |
| 5,353,113 A | 10/1994 | D'Silva |
| 8,089,266 B2 | 1/2012 | Rostamzadeh et al. |
| 8,116,049 B2 | 2/2012 | Ker et al. |
| 2010/0048985 A1 | 2/2010 | Henke et al. |

FOREIGN PATENT DOCUMENTS

| CN | 203337816 U | 12/2013 |
| EP | 0620443 A1 | 10/1994 |

OTHER PUBLICATIONS

Smith et al., "Sources of Impulsive EMI in Large Server Farms", ESD Association, EOS/ESD Symposium Proceedings, 2002, pp. 1-6.
Vaughan et al., "Applications for Embedded Optic Modules in Data Communications", Avago Technologies, White Paper, San Jose, CA, USA, 2011, pp. 1-8.

(Continued)

*Primary Examiner* — Sophia Vlahos
(74) *Attorney, Agent, or Firm* — Law Office of Jim Boice (57) ABSTRACT

A method detects and mitigates harm caused by electromagnetic interference (EMI) to digital transmissions within an electronic circuit. One or more processors check for an initial transmission error during an initial digital transmission between a digital transmitter and a digital receiver on an electronic circuit. In response to detecting the initial transmission error, the processor(s) receive electromagnetic interference (EMI) detection signals from one or more EMI detectors. In response to determining that the EMI detection signals represent an EMI level that exceeds a predetermined value, the processor(s) identify an EMI anomaly source on the electronic circuit and adjusts the EMI anomaly source until the EMI level has been reduced to a nominal level. A copy of the initial digital transmission is then resent from the digital transmitter to the digital receiver. If no transmission error reoccurs, then the EMI anomaly source is kept in the adjusted state.

20 Claims, 4 Drawing Sheets

(56) References Cited

OTHER PUBLICATIONS

Moursy et al, "Automics: A Novel Approach for Substrate Modeling for Automotive Applications", IEEE, 18th IEEE European Test Symposium, 2013, pp. 1-5.
Dhia et al., "On-Chip Noise Sensor for Integrated Circuit Susceptibility Investigations", IEEE, IEEE Transactions on Instrumentation and Measurement, vol. 61, No. 3, March 2012, pp. 696-707.
Rudack et al., "Measurement Technique Developed to Evaluate Transient EMI in a Photo Bay With and Without Air Ionization", International Sematech and ESD Association, EOS/ESD Symposium, 2000, pp. 3C.5.1-3C.5.8.
Cerri et al., "Measurement of Magnetic Fields Radiated From ESD Using Field Sensors", IEEE, IEEE Transactions on Electromagnetic Compatibility, vol. 43, No. 2, May 2001, pp. 187-196.
Foo Kune et al., "Ghost Talk: Mitigating EMI Signal Injection Attacks Against Analog Sensors", IEEE, Proceedings of the IEEE Symposium on Security and Privacy, 2013, pp. 1-15.
N. Jack et al., "Voltage Monitor Circuit for ESD Diagnosis", IEEE, 33rd Electrical Overstress/Electrostatic Discharge Symposium, 2011, pp. 1-9. (Abstract Only).

MITIGATION OF EMI/ESD-CAUSED TRANSMISSION ERRORS ON AN ELECTRONIC CIRCUIT

BACKGROUND

The present disclosure relates to the field of electronic circuits, and specifically to electronic circuits that are vulnerable to damage from electromagnetic interference and electrostatic discharge sources. More specifically, the present disclosure relates to mitigating harm to digital transmissions within electronic circuits caused by electromagnetic interference and electrostatic discharge sources.

Electronic circuits are vulnerable to disruption of normal operation as well as permanent damage from electromagnetic sources and electrostatic discharge sources.

An electromagnetic source produces electromagnetic energy that can damage hardware and/or alter transmitted data. For example, an electromagnetic interference (EMI) can cause transistors to flip ("on" to "off" and vice versa), thus changing the operation of execution units, altering data stored in memory, etc. Furthermore, electromagnetic energy can change bits being transmitted, especially on a high frequency bus, by altering the characteristic of the bits during transmission.

An electrostatic discharge source imposes an electrostatic discharge (ESD) on a circuit. This can cause semiconductors to flip (switch from "on" to "off" and vice versa) and/or can damage the semiconductors by overloading their circuits. Furthermore, an electrostatic discharge can alter bits being transmitted by altering the characteristic of the bits while being transmitted.

SUMMARY

In an embodiment of the present invention, a method and/or computer program product detects and mitigates harm caused by electromagnetic interference (EMI) to digital transmissions within an electronic circuit. A transmission buffer stores a copy of a digital transmission. A digital transmitter transmits an original version of the digital transmission to a digital receiver on an electronic circuit. One or more processors check a transmission fault register for an initial transmission error between the digital transmitter and the digital receiver on the electronic circuit. In response to detecting the initial transmission error, the processor(s) receive electromagnetic interference (EMI) detection signals from one or more EMI detectors, wherein the EMI detection signals represent an anomalous EMI event. In response to determining that the EMI detection signals represent an EMI level that exceeds a predetermined or calibrated value, the processor(s) identify a location of an EMI anomaly source on the electronic circuit, and then selectively adjust the EMI anomaly source until the EMI level drops below the predetermined value when the EMI anomaly source is adjusted to an adjusted state. In response to determining that the EMI level has dropped below the predetermined value, the processor(s) retrieve the copy of the digital transmission from the transmission buffer. The digital transmitter then transmits, to the digital receiver on the electronic circuit, the retrieved copy of the digital transmission from the transmission buffer. The processor(s) recheck the transmission fault register for a subsequent transmission error between the digital transmitter and the digital receiver on the electronic circuit, where the subsequent transmission error potentially would occur while transmitting, from the digital transmitter to the digital receiver on the electronic circuit, the retrieved copy of the digital transmission from the transmission buffer. In response to detecting no subsequent transmission error, the processor(s) maintain the EMI anomaly source at the adjusted state.

In an embodiment of the present invention, a computer circuit comprises: a digital transmitter; a digital receiver; a transmission bus electronically coupling the digital transmitter to the digital receiver; an error detector for detecting errors in the digital transmissions on the transmission bus; a transmission fault register for storing a record of transmission errors detected by the error detector; a transmission buffer for storing a copy of the digital transmissions; an array of electromagnetic interference (EMI)/electrostatic discharge (ESD) detectors; an EMI/ESD monitoring logic for monitoring EMI/ESD signals from the EMI/ESD detectors; an EMI/ESD source, where the EMI/ESD source generates an anomalous EMI/ESD signal that is detected by the EMI/ESD monitoring logic, where the anomalous EMI/ESD signal exceeds a predefined EMI/ESD level; an EMI/ESD source amelioration device, where the EMI/ESD source amelioration device adjusts the EMI/ESD source to an adjusted state in order to bring the anomalous EMI/ESD signal below the predefined EMI/ESD level; a digital transmission replay logic, where the digital transmission replay logic retransmits the copy of the digital transmissions stored in the transmission buffer from the digital transmitter to the digital receiver after the anomalous EMI/ESD signal is below the predefined EMI/ESD level; and a circuit control logic, where the circuit control logic: determines that no transmission error occurred while the digital transmission replay logic retransmits the copy of the data transmissions stored in the transmission buffer from the digital transmitter to the digital receiver after the anomalous EMI/ESD signal is below the predefined EMI/ESD level; and in response to determining that no transmission error occurred while the digital transmission replay logic retransmitted the copy of the digital transmissions stored in the transmission buffer from the digital transmitter to the digital receiver after the anomalous EMI/ESD signal was below the predefined EMI/ESD level, directs the EMI/ESD source amelioration device to keep the EMI/ESD source at the adjusted state in order to keep the anomalous EMI/ESD signal below the predefined EMI/ESD level.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
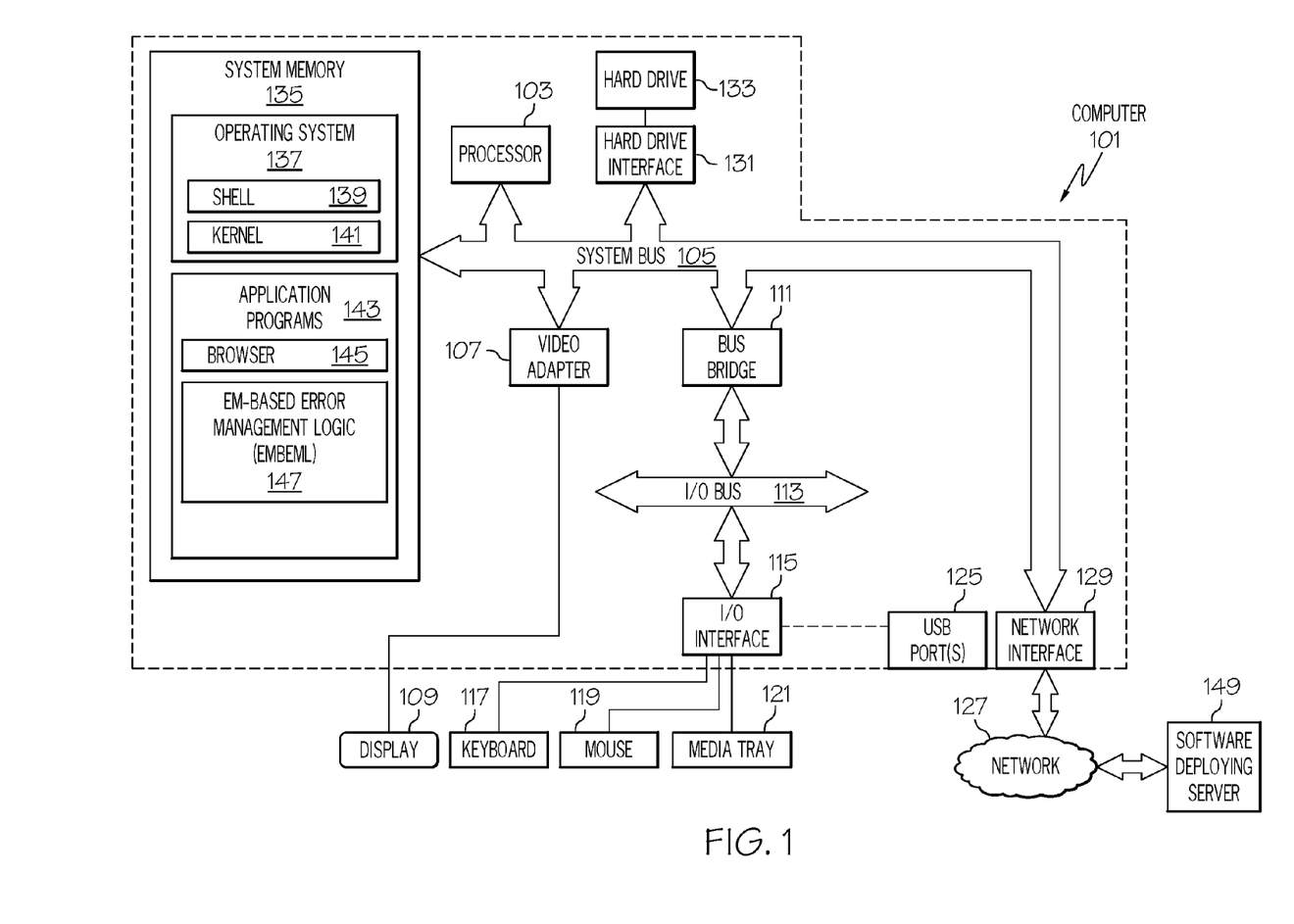
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or electronic circuit 200 shown in FIG. 2.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include an electromagnetic (EM) Based Error Management Logic (EMBEML) 147. EMBEML 147 includes code for implementing the processes described below, including those described in FIGS. 2-3. In one embodiment, computer 101 is able to download EMBEML 147 from software deploying server 149, including in an on-demand basis, wherein the code in EMBEML 147 is not downloaded until needed for execution. In one embodiment of the present invention, software deploying server 149 performs all of the functions associated with the present invention (including execution of EMBEML 147), thus freeing computer 101 from having to use its own internal computing resources to execute EMBEML 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
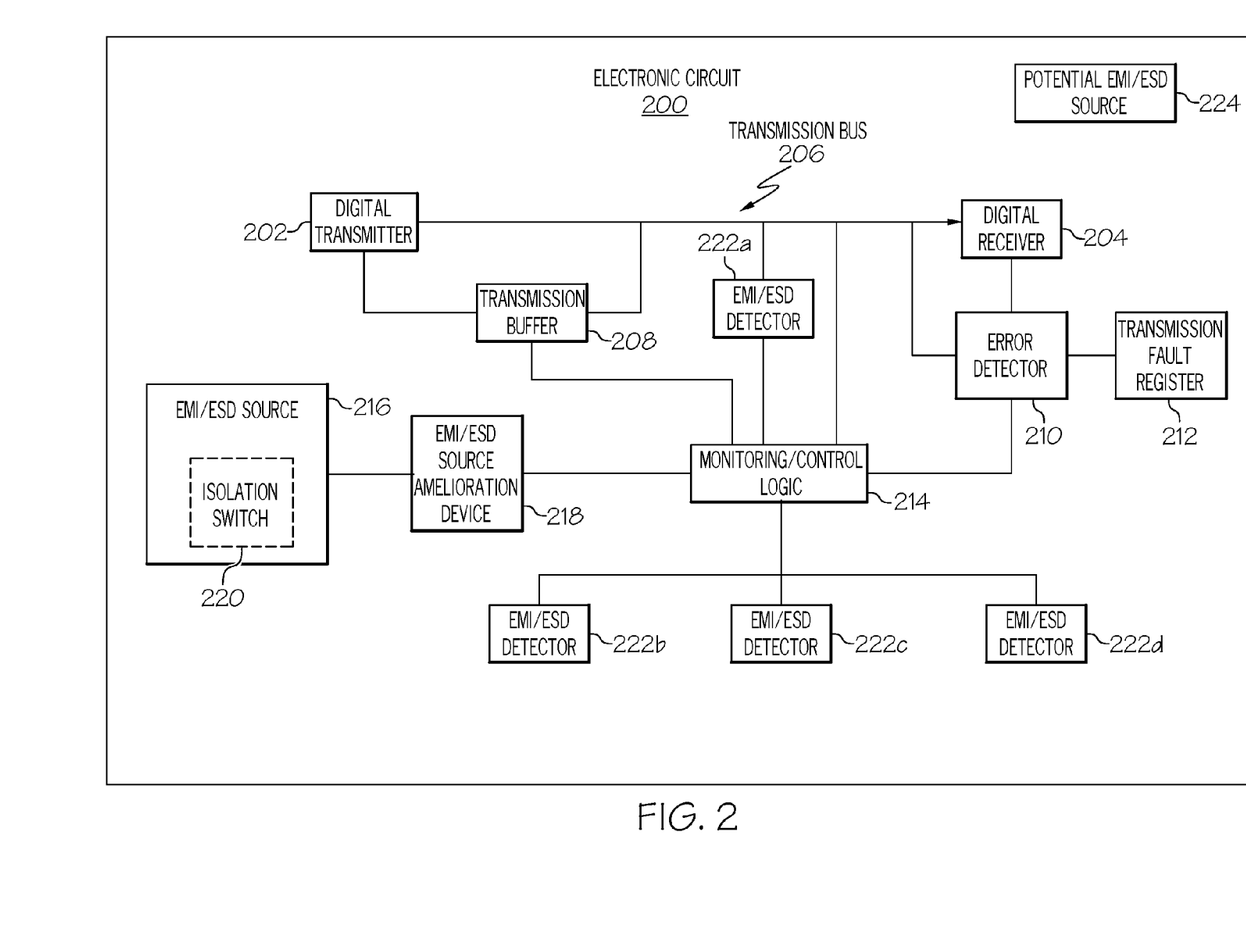
FIG. 2 illustrates an exemplary circuit in accordance with one or more embodiments of the present invention.

With reference now to FIG. 2, an exemplary circuit 200 utilized in accordance with one or more embodiments of the present invention is presented. Electronic circuit 200 may include one or more components of computer 101 shown in FIG. 1, including but not limited to processor 103, system memory 135, system bus 105, I/O interface 115, etc. Thus, electronic circuit 200 may be viewed as an electronic system (e.g., a motherboard, a blade server, a computer, etc.) or a component of the electronic system.

As shown in FIG. 2, electronic circuit 200 includes a digital transmitter 202 that sends digital transmissions to a digital receiver 204 over a transmission bus 206. Alternatively digital queues may be used with a digital or analog transmitter to provide such communications. It is understood that digital transmitter 202 and digital receiver 204 may each be transceivers, such that the role/function of digital transmitter 202 can switch to that of a digital (or alternatively, analog) receiver and the role/function of digital receiver 204 can switch to that of a digital transmitter. As used herein, the term "digital transmission" is defined as any transmitted informational digital electronic signal, including signals that represent data (e.g., alphanumeric characters, values, variables, etc.) or computer executable program instructions.

In one or more embodiments of the present invention, digital transmitter 202 is the processor 103 shown in FIG. 1; digital receiver 204 is system memory 135, hard drive 133, I/O interface 115, and/or video adapter 107, etc. shown in FIG. 1; and transmission bus 206 is system bus 105 and/or I/O bus 113 shown in FIG. 1. Thus, the digital transmissions may be data and/or instructions being transmitted by the processor 103 from system memory 135 to the hard drive 133; from the hard drive 133 to system memory 135; from system memory 135 to the I/O interface 115; from the I/O interface 115 to the system memory 135; etc.

In another example, digital transmitter 202 may be keyboard 117 or mouse 119 shown in FIG. 1; digital receiver 204 may be system memory 135, processor 103, etc.; transmission bus 206 may be I/O bus 113 and/or system bus 105; and the digital transmissions may be electronic inputs (representing data and/or instructions) from the keyboard 117 or mouse 119.

As shown in FIG. 2, a transmission buffer 208 maintains a record of digital transmissions between the digital transmitter 202 and the digital receiver 204. That is, a copy of the digital transmission (e.g., data, computer-executable instructions) from digital transmitter 202 to digital receiver 204 is captured by transmission buffer 208 before the digital transmission occurs, thus ensuring a "clean" copy of the original digital transmission is maintained. In one embodiment, this digital transmission passes through the transmission buffer 208 on the way from the digital transmitter 202 to the digital receiver 204, such that the transmission buffer 208 functions as a first-in last-out (FILO) circular buffer that passes the data/instructions on to digital receiver 204 when full. In a preferred embodiment, however, the transmission buffer 208 acts in parallel to the transmission bus 206, such that the original digital transmission passes unobstructed through the transmission bus 206, while the transmission buffer 208 receives (from the digital transmitter 202) and stores a copy of the digital transmission.

An error detector 210 detects any errors in the digital transmission to the digital receiver 204. Error detector 210 may use any type of error detection logic known to those skilled in the art of error detection, such as parity checking hardware, the use of error-correcting code (ECC) in the digital transmission, checksum algorithms, checksums, cyclic redundancy checks (CRCs), cryptographic hash functions, etc. If a transmission error occurs (i.e., what the digital transmitter 202 transmitted does not match what the digital receiver 204 receives and/or stores), then the error detection logic 210 stores a record of the error in a transmission fault register 212.

As shown in FIG. 2, electronic circuit 200 includes a monitoring/control logic 214 that acts as 1) an electromagnetic interference/electrostatic discharge (EMI/ESD) monitoring logic; 2) a digital transmission replay logic; and 3) a circuit control logic.

When functioning as an EMI/ESD monitoring logic, monitoring/control logic 214 monitors an array of EMI/ESD detectors, such as the depicted EMI/ESD detectors 222a-222d.

As the name indicates, EMI/ESD detectors 222a-222d are able to detect electromagnetic interference (EMI) and electrostatic discharge (ESD).

When functioning as an EMI detector, one or more of the EMI/ESD detectors 222a-222d utilize a mixer that takes inputs from antennae and an oscillator, filters the mix, and determines the strength of the EMI. That is, electromagnetic (EM) fields induce a voltage in an antenna (e.g., a short dipole or a simple wire loop). A mixer mixes the antenna signal with a certain frequency from an oscillator. The output of the mixer is then sent to an envelope detector, which measures a magnitude of the antenna signal, which represents the field strength at the selected frequency of the EMI.

When functioning as an ESD detector, one or more EMI/ESD detectors 222a-222d receive transient induction of a voltage onto an antenna (e.g., a simple wire loop). The induced antenna signal (scaled down with a voltage divider, as necessary, to ensure that the charged capacitor voltage stays below the VDDM level of the circuit) is fed into an input of a pair of parallel field effect transistors (FETs), which outputs an analog signal descriptive of the electrostatic discharge. An analog-to-digital (ADC) converter then digitizes the output from the FETs into a quantified ESD value.

When acting as a digital transmission replay logic, monitoring/control logic 214 will retrieve the information (data/instructions) stored in the transmission buffer 208, and then cause the digital transmitter 202 to retransmit that information to the digital receiver 204. As described herein, this retransmission is performed after the EMI/ESD source 216 is adjusted, as discussed below.

EMI/ESD source 216 is hardware that generates an EMI and/or causes an ESD. Examples of EMI/ESD source 216 include, but are not limited to, power transformers, power busses, data busses, integrated circuits, etc. That is, EMI/ESD source 216 is any electronic device capable of generating stray electromagnetic energy that causes EMI, or that is capable of creating and/or inducing an ESD on a circuit. In accordance with the present invention, EMI/ESD source 216 generates an anomalous EMI/ESD signal that is detected by the EMI/ESD monitoring logic 214. This anomalous EMI/ESD signal may exceed a predefined EMI/ESD level (i.e., is beyond nominal and otherwise harmless EMI/ESD levels).

When functioning as a circuit control logic, monitoring/control logic 214 monitors the error detector 210. If no new transmission errors occur 1) when replaying the transmission of the information stored in the transmission buffer 208 from the digital transmitter 202 to the digital receiver 204, and 2) after the EMI/ESD source 216 is adjusted such that the EMI/ESD source 216 no longer produces harmful EMI/ESD signals, then the EMI/ESD source 216 is maintained at the adjusted level.

Adjustment of the EMI/ESD source 216 is achieved by an EMI/ESD source amelioration device 218, which may be part of monitoring/control logic 214 and/or part of the EMI/ESD source 216 itself. The EMI/ESD source 216 can be adjusted by 1) throttling it back, and/or by 2) isolating and/or disabling it.

For example, assume that EMI/ESD source 216 is a microprocessor that is emitting EMI/ESD signals that are harmful to the integrity of information being transmitted along transmission bus 206. The number of operations-per-second being performed by, or the clock speed of, the microprocessor can be reduced (throttled back) by the EMI/ESD source amelioration device 218, thus reducing the EMI/ESD energy being emitted from the microprocessor.

In another example, continue to assume that EMI/ESD source 216 is a microprocessor that is emitting EMI/ESD signals that are harmful to the integrity of information being transmitted along transmission bus 206. In this example, rather than throttling back the microprocessor, the microprocessor is 1) turned off, or 2) isolated by opening an isolation switch 220, thus preventing the microprocessor from imposing EMI/ESD signals over wires to the rest of electronic circuit 200.

Thus, monitoring/control logic 214, when functioning as the circuit control logic, can determine that no transmission error occurred while the digital transmission replay logic retransmits the copy of the data transmissions stored in the transmission buffer 208 from the digital transmitter 202 to the digital receiver 204 after the anomalous EMI/ESD signal is below a predefined EMI/ESD level. Thereafter and in response to determining that no transmission error occurred while the digital transmission replay logic retransmitted the copy of the digital transmissions stored in the transmission buffer 208 from the digital transmitter 202 to the digital receiver 204 after the anomalous EMI/ESD signal was below the predefined EMI/ESD level, the circuit control logic directs the EMI/ESD source amelioration device 218 to keep the EMI/ESD source at the adjusted state in order to keep the anomalous EMI/ESD signal below the predefined (harmful) EMI/ESD level.

In FIG. 2, several EMI/ESD detectors 222a-222d on electronic circuit 200 are depicted. In one embodiment, an EMI/ESD detector 222a is coupled to the transmission bus 206. Thus, if the monitoring/control logic 214 receives a signal from EMI/ESD detector 222a that an EMI/ESD event has occurred, then the information from transmission buffer 208 will be retransmitted as described above after the EMI/ESD source 216 is identified and adjusted (throttled back, isolated, etc.).

When using only a single EMI/ESD detector 222a, it is difficult to identify EMI/ESD source 216 and its location unless there is only one possible EMI/ESD source 216 on the electronic circuit 200, in which case a single EMI/ESD detector 222a is adequate.

However, assume that there are multiple possible EMI/ESD sources, including the depicted EMI/ESD source 216 as well as other EMI/ESD sources such as potential EMI/ESD source 224 shown in FIG. 2. In this situation, multiple EMI/ESD detectors 222b-222d can triangulate the location of the EMI/ESD source 216 that is actually causing the problem by comparing the different EMI/ESD readings taken by the EMI/ESD detectors 222b-222d. That is, if EMI/ESD detector 222b detects a strong EMI/ESD signal, and EMI/ESD detector 222c detects a slightly weaker EMI/ESD signal, and EMI/ESD detector 222d detects an even weaker EMI/ESD signal, then the location of EMI/ESD source 216 can be determined by monitoring/control logic 214 based on the sensor readings being output by EMI/ESD detectors 222b-222d. However, if EMI/ESD detector 222d detects a strong EMI/ESD signal, and EMI/ESD detector 222c detects a slightly weaker EMI/ESD signal, and EMI/ESD detector 222b detects an even weaker EMI/ESD signal, then potential EMI/ESD source 224 is identified by monitoring/control logic 214 as being the likely cause of the EMI/ESD disturbance, and its location is derived based on the sensor readings being output by EMI/ESD detectors 222b-222d.

Figure 3:
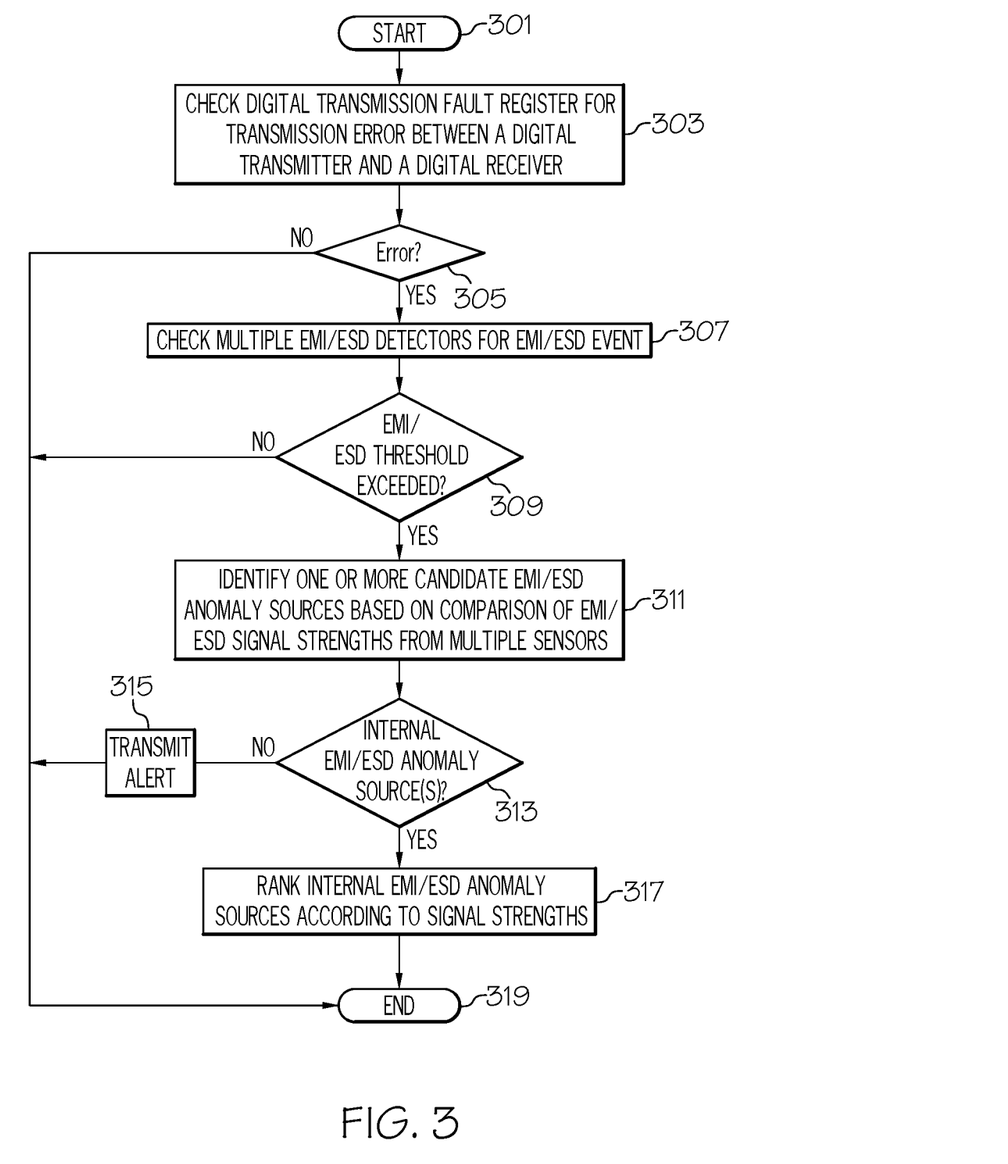
FIG. 3 and FIG. 4 are high-level flow charts of one or more steps performed by one or more computing and/or other hardware devices to ameliorate an anomalous effect on an electronic circuit caused by an electromagnetic interference (EMI) and/or an electrostatic discharge (ESD).
Figure 4:
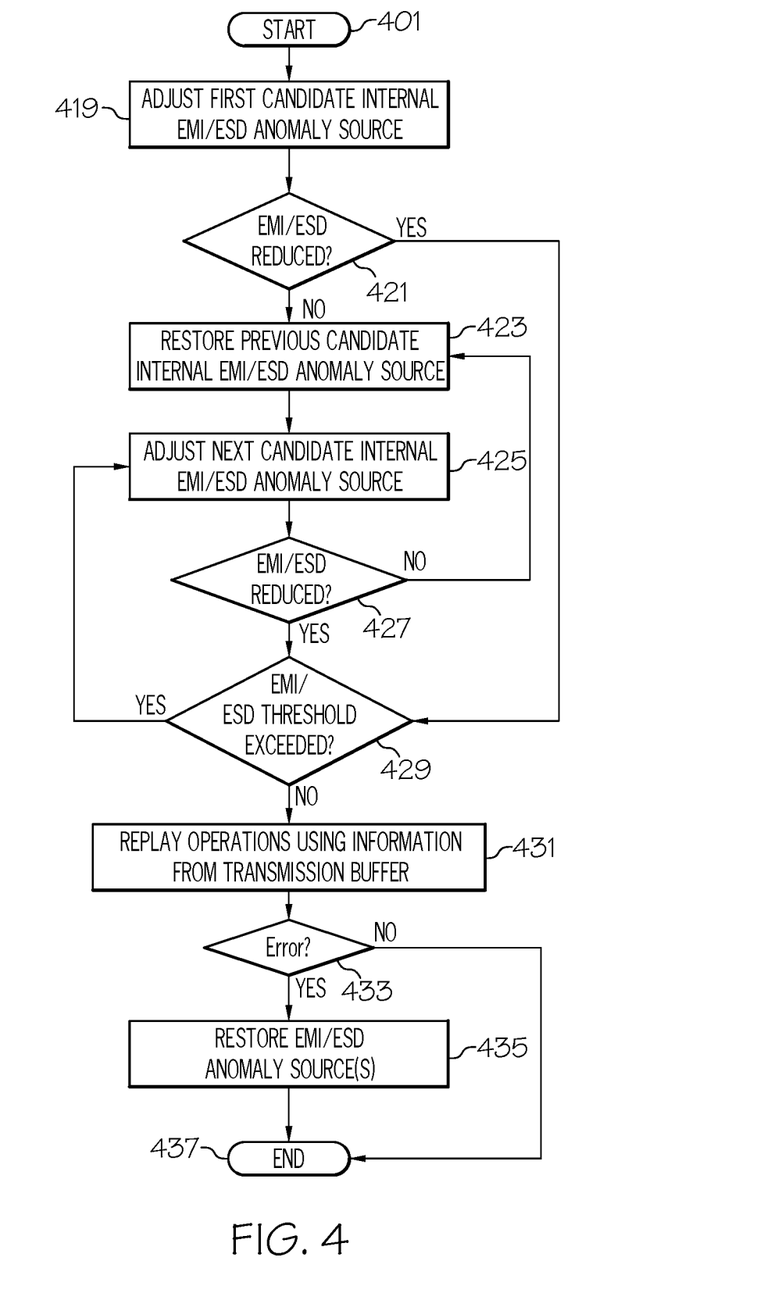

With reference now to FIG. 3 and FIG. 4, high-level flow charts of one or more steps performed by one or more computing and/or other hardware devices to ameliorate an anomalous effect on an electronic circuit caused by an electromagnetic interference (EMI) and/or an electrostatic discharge (ESD) is presented. As shown, FIG. 3 is directed to error handling, and FIG. 4 is directed to source mitigation.

With reference now to FIG. 3, after initiator block 301, the monitoring/control logic 214 shown in FIG. 2 checks the transmission fault register 212 to see if a data transmission error (detected by the error detector 210) occurred when digital transmitter 202 sent a digital transmission to digital receiver 204 via transmission bus 206 (block 303).

If such an error occurred (query block 305), then the EMI/ESD detectors 222a-222d are checked to see if they have detected an EMI/ESD event (block 307). If so, a query is made (query block 309) to determine whether the detected EMI/ESD event exceeded an EMI/ESD threshold (i.e., a level that is greater than nominal/background EMI/ESD levels).

If so, then the strength of the EMI/ESD signal(s) being received by one or more of the EMI/ESD detectors 222a-222d are compared to identify the source of the anomalous EMI/ESD energy, as described in block 311. If this evaluation (query block 313) concludes that the source of the anomalous EMI/ESD energy is not on the electronic circuit 200 (i.e., a local printed circuit board, computer, etc.), then an alert is sent to a supervisory computer (not shown), directing the supervisory computer (e.g., a hypervisor computer) to rectify the device that is causing the EMI/ESD issue (block 315). For example, a hypervisor or supervisory computer enables a management or field service processor. Furthermore and in one or more embodiments of the present invention, reporting logic (e.g., a supervisory computer) communicates directly to the system through software and enabling gating in the processor or other application specific integrated circuits (ASICs) based on the reported information.

However, if the EMI/ESD source 216 is determined to be on the local electronic circuit 200, then all potential EMI/ESD sources are ranked according to the EMI/ESD signal strengths being emitted therefrom (block 317). That is, assume that by using the EMI/ESD signal strengths detected by one or more of EMI/ESD detectors 222a-222d, monitoring/control logic 214 is able to determine that potential EMI/ESD source 224 is putting out EMI/ESD energy that is being imposed on transmission bus 206 at a level "X", and is able to determine that EMI/ESD source 216 is putting out EMI/ESD energy that is being imposed on transmission bus 206 at a level "2X". As such, since EMI/ESD source 216 is the most likely source of the problem, then EMI/ESD source 216 is the highest ranked EMI/ESD anomaly source. The flow-chart of FIG. 3 ends at terminator block 319.

With reference now to FIG. 4, after initiator block 401, the first EMI/ESD source 216 will be the first EMI/ESD source to be throttled back, isolated, or otherwise adjusted in order to reduce the amount of EMI/ESD it is generating (block 419).

However, if throttling back or otherwise adjusting EMI/ESD source 216 does not reduce the amount of EMI/ESD energy being detected by EMI/ESD detector 222a (query block 421) and/or by other EMI/ESD detectors 222b-222d, then EMI/ESD source 216 was not the problem, and will be restored to its previous un-throttled and/or un-isolated state (block 423), and the potential EMI/ESD source 224 is throttled back, isolated, etc. (block 425). If this brings the EMI/ESD impact on the transmission bus 206 down (query block 427), such that the EMI/ESD threshold is no longer exceeded (query block 429), then the monitoring/control logic 214 will "replay operations" (i.e., direct the digital transmitter 202 to resend the information in the transmission buffer 208 to the digital receiver 204), as described in block 431.

If an error no longer occurs during this retransmission (query block 333), then the problematic EMI/ESD source has been identified, and will remain throttled back, isolated, etc. (terminator block 437). However, if an error still occurs even though the amount of EMI/ESD energy is below the EMI/ESD threshold (see query block 429) due to throttling back the EMI/ESD source(s), then the throttled-back EMI/ESD sources are restored to their initial state (block 435), since they are apparently not the cause of the data transmission error. The flow chart ends at terminator block 437.

Thus, the present invention presents a novel system, method, and/or computer program product for detecting and mitigating electromagnetic harm to a digital transmission in an electronic circuit. A digital transmitter (e.g., digital transmitter 202 shown in FIG. 2) transmits a digital transmission to a digital receiver (e.g., digital receiver 204 shown in FIG. 2), where the digital transmitter and the digital receiver are on an electronic circuit (e.g., electronic circuit 200 shown in FIG. 2).

A transmission buffer (e.g., transmission buffer 208 shown in FIG. 2) captures a copy of the digital transmission.

One or more processors (e.g., part of monitoring/control logic 214 shown in FIG. 2) check a transmission fault register (e.g., transmission fault register 212 shown in FIG. 2) for an initial transmission error between the digital transmitter and the digital receiver on the electronic circuit.

In response to detecting the initial transmission error, the processor(s) receive electromagnetic interference (EMI) detection signals from one or more EMI detectors (e.g., one or more of the EMI/ESD detectors 222a-222d shown in FIG. 2), where the EMI detection signals represent an anomalous EMI event.

In response to determining that the EMI detection signals represent an EMI level that exceeds a predetermined value, the processor(s) identify a location of an EMI anomaly source (e.g., EMI/ESD source 216 shown in FIG. 2) on the electronic circuit. In an embodiment of the present invention, the predetermined value can be determined by a trained calibration routine that adjusts to the general noise of the environment below what the design will tolerate, then adjust reporting based on that.

The processor(s) selectively adjust the EMI anomaly source until the EMI level drops below the predetermined value at an adjusted state (e.g., the EMI level is below the predetermined level when the EMI anomaly source is throttled back).

In response to determining that the EMI level has dropped below the predetermined value, the processor(s) retrieve the copy of the digital transmission from the transmission buffer, where the copy of the digital transmission is a copy of digital information that was previously transmitted from the digital transmitter to the digital receiver before the anomalous EMI event and after the transmission error occurred.

The digital transmitter then transmits the retrieved copy of the digital information from the transmission buffer to the digital receiver on the electronic circuit.

The processor(s) then recheck the transmission fault register for a subsequent transmission error between the digital transmitter and the digital receiver on the electronic circuit, where the subsequent transmission error occurred while transmitting, from the digital transmitter to the digital receiver on the electronic circuit, the retrieved copy of the digital transmission from the transmission buffer.

In response to detecting no subsequent digital transmission error, the processor(s) maintain the EMI anomaly source at the adjusted state (since this EMI anomaly source was apparently the cause of the error in the initial digital transmission).

In an embodiment of the present invention, the adjusted state is a throttled back state of the EMI anomaly source.

In an embodiment of the present invention, the adjusted state is an isolation of the EMI anomaly source from the electronic circuit.

In an embodiment of the present invention, the digital transmission being transmitted from the digital transmitter to the digital receiver is processor-executable instructions.

In an embodiment of the present invention, the digital transmission being transmitted from the digital transmitter to the digital receiver is data.

In an embodiment of the present invention, the one or more EMI detectors are part of the electronic circuit.

In an embodiment of the present invention, one or more processors identify the location of the EMI anomaly source by evaluating a strength and direction of EMI signals being received by the one or more EMI detectors, as described herein.

In an embodiment of the present invention, in response to detecting the initial transmission error, one or more processors receive one or more electrostatic discharge (ESD) detection signals from an ESD detector. In response to determining that the ESD detection signals represent an ESD level that exceeds a predetermined value, the processor(s) identify the location of the ESD anomaly source by evaluating a strength and direction of ESD signals being received by the ESD detector.

In an embodiment of the present invention, in response to detecting the initial transmission error, one or more processors receive electrostatic discharge (ESD) detection signals from multiple ESD detectors. In response to determining that the ESD detection signals represent an ESD level that exceeds a predetermined value, one or more processor(s) identify a location of an ESD anomaly source on the electronic circuit based on strengths and directions of ESD signals being received by the multiple ESD detectors.

In an embodiment of the present invention, in response to determining that the EMI detection signals represent an EMI level that exceeds a predetermined value, one or more processor(s) identify a location of multiple EMI anomaly sources on the electronic circuit, and then selectively adjust the multiple EMI anomaly sources until the EMI level drops below the predetermined value.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of detecting and mitigating harm caused by electromagnetic interference (EMI) to digital transmissions within an electronic circuit, the method comprising:
    storing, by a transmission buffer, a copy of a digital transmission;
    transmitting an original version of the digital transmission from a digital transmitter to a digital receiver on an electronic circuit;
    checking, by one or more processors, a transmission fault register for an initial transmission error between the digital transmitter and the digital receiver on the electronic circuit;
    in response to detecting the initial transmission error, receiving, by one or more processors, electromagnetic interference (EMI) detection signals from one or more EMI detectors, wherein the EMI detection signals represent an anomalous EMI event;

in response to determining that the EMI detection signals represent an EMI level that exceeds a predetermined value, identifying, by one or more processors, an EMI anomaly source on the electronic circuit;

selectively adjusting, by one or more processors, the EMI anomaly source until the EMI level drops below the predetermined value while the EMI anomaly source is in an adjusted state;

in response to determining that the EMI level has dropped below the predetermined value, retrieving, by one or more processors, the copy of the digital transmission from the transmission buffer;

transmitting, from the digital transmitter to the digital receiver on the electronic circuit, the retrieved copy of the digital transmission from the transmission buffer;

rechecking, by one or more processors, the transmission fault register for a subsequent transmission error between the digital transmitter and the digital receiver on the electronic circuit, wherein the subsequent transmission error occurs while transmitting, from the digital transmitter to the digital receiver on the electronic circuit, the retrieved copy of the digital transmission from the transmission buffer; and in response to detecting no subsequent transmission error, maintaining, by one or more processors, the EMI anomaly source at the adjusted state.

2. The method of claim 1, wherein the adjusted state is a throttled back state of the EMI anomaly source.

3. The method of claim 1, wherein the adjusted state is an isolation of the EMI anomaly source from the electronic circuit.

4. The method of claim 1, wherein the digital transmission being transmitted from the digital transmitter to the digital receiver is processor-executable instructions.

5. The method of claim 1, wherein the digital transmission being transmitted from the digital transmitter to the digital receiver is data.

6. The method of claim 1, wherein the one or more EMI detectors are part of the electronic circuit.

7. The method of claim 1, further comprising:
identifying, by one or more processors, the location of the EMI anomaly source by evaluating a strength and direction of EMI signals being received by the one or more EMI detectors.

8. The method of claim 1, further comprising:
in response to detecting the initial transmission error, receiving, by one or more processors, an electrostatic discharge (ESD) detection signal from an ESD detector; and
in response to determining that the ESD detection signal represents an ESD level that exceeds a predetermined value, identifying, by one or more processors, a location of an ESD anomaly source on the electronic circuit.

9. The method of claim 8, further comprising:
identifying, by one or more processors, the location of the ESD anomaly source by evaluating a strength and direction of ESD signals being received by the ESD detector.

10. The method of claim 1, further comprising:
in response to detecting the initial transmission error, receiving, by one or more processors, electrostatic discharge (ESD) detection signals from multiple ESD detectors;

in response to determining that the ESD detection signals represent an ESD level that exceeds a predetermined value, identifying, by one or more processors, a location of an ESD anomaly source on the electronic circuit based on strengths and directions of ESD signals being received by the multiple ESD detectors.

11. The method of claim 1, further comprising:
in response to determining that the EMI detection signals represent an EMI level that exceeds a predetermined value, identifying, by one or more processors, a location of multiple EMI anomaly sources on the electronic circuit; and
selectively adjusting, by one or more processors, the multiple EMI anomaly sources until the EMI level drops below the predetermined value.

12. A computer program product for detecting and mitigating harm caused by electromagnetic interference (EMI) to digital transmissions within an electronic circuit, the computer program product comprising a non-transitory computer readable storage medium having program code embodied therewith, the program code readable and executable by a processor to perform a method comprising:
storing, by a transmission buffer, a copy of a digital transmission;
transmitting an original version of the digital transmission from a digital transmitter to a digital receiver on an electronic circuit;
checking a transmission fault register for an initial transmission error between the digital transmitter and the digital receiver on the electronic circuit;
in response to detecting the initial transmission error, receiving electromagnetic interference (EMI) detection signals from one or more EMI detectors, wherein the EMI detection signals represent an anomalous EMI event;
in response to determining that the EMI detection signals represent an EMI level that exceeds a predetermined value, identifying an EMI anomaly source on the electronic circuit;
selectively adjusting the EMI anomaly source until the EMI level drops below the predetermined value while the EMI anomaly source is in an adjusted state;
in response to determining that the EMI level has dropped below the predetermined value, retrieving the copy of the digital transmission from the transmission buffer;
transmitting, from the digital transmitter to the digital receiver on the electronic circuit, the retrieved copy of the digital transmission from the transmission buffer;
rechecking the transmission fault register for a subsequent transmission error between the digital transmitter and the digital receiver on the electronic circuit, wherein the subsequent transmission error occurs while transmitting, from the digital transmitter to the digital receiver on the electronic circuit, the retrieved copy of the digital transmission from the transmission buffer; and
in response to detecting no subsequent transmission error, maintaining the EMI anomaly source at the adjusted state.

13. The computer program product of claim 12, wherein the adjusted state is a throttled back state of the EMI anomaly source.

14. The computer program product of claim 12, wherein the adjusted state is an isolation of the EMI anomaly source from the electronic circuit.

15. The computer program product of claim 12, wherein the one or more EMI detectors are part of the electronic circuit.

16. The computer program product of claim 12, wherein the method further comprises:
  identifying the location of the EMI anomaly source by evaluating a strength and direction of EMI signals being received by the one or more EMI detectors.

17. The computer program product of claim 12, wherein the method further comprises:
  in response to detecting the initial transmission error, receiving electrostatic discharge (ESD) detection signals from an ESD detector; and
  in response to determining that the ESD detection signals represent an ESD level that exceeds a predetermined value, identifying the location of the ESD anomaly source by evaluating a strength and direction of ESD signals being received by the ESD detector.

18. The computer program product of claim 12, wherein the method further comprises:
  in response to detecting the initial transmission error, receiving electrostatic discharge (ESD) detection signals from multiple ESD detectors;
  in response to determining that the ESD detection signals represent an ESD level that exceeds a predetermined value, identifying a location of an ESD anomaly source on the electronic circuit based on strengths and directions of ESD signals being received by the multiple ESD detectors.

19. The computer program product of claim 12, wherein the method further comprises:
  in response to determining that the EMI detection signals represent an EMI level that exceeds a predetermined value, identifying a location of multiple EMI anomaly sources on the electronic circuit; and
  selectively adjusting the multiple EMI anomaly sources until the EMI level drops below the predetermined value.

20. A computer circuit comprising:
  a digital transmitter;
  a digital receiver;
  a transmission bus electronically coupling the digital transmitter to the digital receiver;
  a transmission buffer for storing a copy of digital transmissions;
  an error detector for detecting errors in the digital transmissions on the transmission bus;
  a transmission fault register for storing a record of transmission errors detected by the error detector;
  an array of electromagnetic interference (EMI)/electrostatic discharge (ESD) detectors;
  an EMI/ESD monitoring logic for monitoring EMI/ESD signals from the EMI/ESD detectors;
  an EMI/ESD source, wherein the EMI/ESD source generates an anomalous EMI/ESD signal that is detected by the EMI/ESD monitoring logic, wherein the anomalous EMI/ESD signal exceeds a predefined EMI/ESD level;
  an EMI/ESD source amelioration device, wherein the EMI/ESD source amelioration device adjusts the EMI/ESD source to an adjusted state in order to bring the anomalous EMI/ESD signal below the predefined EMI/ESD level;
  a digital transmission replay logic, wherein the digital transmission replay logic retransmits the copy of the digital transmissions stored in the transmission buffer from the digital transmitter to the digital receiver after the anomalous EMI/ESD signal is below the predefined EMI/ESD level; and
  a circuit control logic, wherein the circuit control logic:
    determines that no transmission error occurs while the digital transmission replay logic retransmits the copy of the data transmissions stored in the transmission buffer from the digital transmitter to the digital receiver after the anomalous EMI/ESD signal is below the predefined EMI/ESD level; and
    in response to determining that no transmission error occurred while the digital transmission replay logic retransmitted the copy of the digital transmissions stored in the transmission buffer from the digital transmitter to the digital receiver after the anomalous EMI/ESD signal was below the predefined EMI/ESD level, directs the EMI/ESD source amelioration device to keep the EMI/ESD source at the adjusted state in order to keep the anomalous EMI/ESD signal below the predefined EMI/ESD level.

* * * * *